United States Patent [19]

Voytko et al.

[11] 4,378,946
[45] Apr. 5, 1983

[54] STROLLER CANOPY STRUCTURE

[75] Inventors: Charles L. Voytko; Robert J. Boudreau, both of Bedford, Pa.

[73] Assignee: Brown Group Recreational Products, Inc., Bedford, Pa.

[21] Appl. No.: 227,155

[22] Filed: Jan. 22, 1981

[51] Int. Cl.³ .............................................. B62B 11/00
[52] U.S. Cl. .................................. 280/642; 280/650; 297/184
[58] Field of Search ..................... 280/650, 641–644, 280/639, 647, 649, 658, 651, 47.38, 47.4; 5/416; 160/45–46; 297/184; 135/54, 7.1 A

[56] References Cited

U.S. PATENT DOCUMENTS

| | | | |
|---|---|---|---|
| 3,847,406 | 11/1974 | Burnham | 280/644 |
| 3,873,117 | 3/1975 | Perego | 280/650 |
| 4,165,097 | 8/1979 | Boudreau et al. | 280/647 |

Primary Examiner—Joseph F. Peters, Jr.
Assistant Examiner—Timothy Roesch
Attorney, Agent, or Firm—Cesari and McKenna

[57] ABSTRACT

A canopy structure for a collapsible stroller includes a first bail whose bight is shorter than the distance between the arms of the stroller pusher handle, the free ends of the first bail being pivotally connected to the pusher handle arm at inboard walls thereof. The canopy structure also includes a second shallower bail whose bight is longer than the distance between the pusher handle arms and includes means for pivotally connecting the free ends of the second bail to the pusher handle arms at the outboard walls thereof at points spaced above the pivotal connections of the first bail. A flexible fabric body is connected between the bights of the bails which body is dimensioned so that, when the first bail is oriented in a substantially horizontal plane, the bight of the second bail engages the pusher handle so that the fabric body is stretched between the two bails. The first bail can be swung upwards to repose on the upper bail which drops down to a location below the pusher handle so that the first bail is located in an overcentered out-of-the-way position. Also, when the stroller is in its collapsed position, the second bail can be engaged over the stroller backrest to help retain the stroller in that collapsed position.

6 Claims, 3 Drawing Figures

STROLLER CANOPY STRUCTURE

This invention relates to a collapsible baby stroller. It relates more particularly to an improved canopy structure therefor which can be raised and lowered as needed and which also functions to help secure the stroller in its collapsed position.

BACKGROUND OF THE INVENTION

A hood or canopy is included on a stroller in order to shield the stroller occupant from rain or excessive sun. Typically, a canopy of this general type is movable from a lower position wherein the canopy overhangs the stroller seat and its occupant to a raised position wherein the canopy reposes against the stroller pusher handle thereby exposing the stroller occupant to the sunlight.

Generally, the prior canopy structures include a generally U-shaped bail whose opposite ends are pivotally connected to the outer walls of the opposite arms of the pusher handle. The front and side edges of the canopy fabric are secured to the bail. A detent on the bail engages the pusher handle when the bail lies in a substantially horizontal plane directly above the stroller seat. The canopy is maintained in that lower or open position by the weight of the bail. Also, flaps may be provided at the opposite sides of the canopy which extend down toward the pusher handle arms. These flaps carry snap fastener elements which can be connected to mating snap fastener elements affixed to those arms. On the other hand, when the canopy is in its raised position, the bail reposes against the upper end of the pusher handle.

As such, in these prior constructions, the raised canopy projects above and forwardly of the pusher handle arms constituting an obstruction. Furthermore, when the vehicle is maneuvered down stairs or over a curbstone, sometimes the canopy swings of its own accord and under its own weight to its open lower position. This constitutes an annoyance to the parent who must then stop and return the canopy to its raised position. Accordingly, to avoid these problems, the canopy is frequently removed from the stroller and is thus not available when it is really needed.

SUMMARY OF THE INVENTION

Accordingly, the present invention aims to provide an improved canopy structure for a collapsible stroller.

Another object of the present invention is to provide an improved canopy structure which requires no straps or other detachable devices to maintain the canopy in its raised position.

Another object is to provide a stroller canopy structure which in its raised position is completely out of the way and does not interfere at all with the parent's view of the child in the stroller.

Another object of the invention is to provide a stroller canopy which is readily removable from the stroller in the event that it is not needed or for purposes of cleaning the canopy material.

Yet another object of the invention is to provide canopy structure for a collapsible stroller which helps to lock the stroller in its collapsed position.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

In general, the present canopy construction employs a generally U-shaped bail which is pivotally connected to the inboard walls of the opposite arms of the stroller pusher handle at locations thereon above the top of the stroller backrest. A second generally U-shaped bail which is much shallower than the first is pivotally connected to the pusher handle arms at locations spaced above the first bail connections thereto. Furthermore, the bight of the second bail is positioned under the pusher handle arms and is longer than the distance between those arms and its ends are pivotally connected to the outboard walls of those arms so that the second bail cannot pivot above or forwardly of those arms.

The canopy fabric material is secured between the bights of the two bails and the length of the canopy is such that when the larger, lower bail is substantially horizontal with respect to the ground, the upper bail engages the underside of the pusher handle so that the canopy material is stretched between the two bails forming a covering directly above the stroller seat. Preferably also, the canopy includes side sections which extend around the corners of the bail rearwardly toward the pusher handle arms so that the lower or open canopy forms a hood.

Desirably also, side flaps extend down from the lower edges of the canopy side sections toward points on the pusher handle arms below the pivot points of the larger bail. These flaps carry snap fastener elements which can be removably secured to mating snap fastener elements attached to the pusher handle arms so as to maintain the canopy in its aforesaid open lower position.

When the canopy is not needed, it can be raised to an upper position wherein it no longer overlies the stroller seat and reposes in an out-of-the-way location below and rearwardly of the upper end of the pusher handle. To raise the canopy, the lower bail is swung up toward the upper end at the pusher handle which releases the tension on the canopy material. Thus, in turn, permits the shallower upper bail to swing down below the pusher handle with the result that the larger bail and the canopy material supported thereby can nest against the bight of the upper bail at a location slightly rearwardly and below the upper end of the pusher handle arms. Consequently, the canopy supporting structure and the canopy material itself are situated at an out-of-the-way location below the upper end of the pusher handle so that the person maneuvering the stroller has a clear view of the stroller occupant.

Furthermore, the support offered by the upper shallower bail causes the lower bail to swing to an overcenter position under the upper end of the pusher handle so that even if the stroller is tilted forwardly to maneuver it over a curbstone or down steps, the canopy has little tendency to swing down to its lower position.

In addition, when folding the stroller, the pusher handle is pivoted so that the seat structure drops down toward the stroller undercarriage. When the stroller is in its fully collapsed position, the upper canopy bail which is pivotally attached to the pusher handle can be engaged over the normally upper edge of the stroller backrest structure so as to help maintain the stroller in its fully collapsed position thereby facilitating the transportation and storage of the stroller.

As a result of the aforesaid canopy construction, the raised canopy is in an out-of-the-way position wherein it does not bother the parent pushing the stroller. Also, no special detachable straps or clips are required to maintain the canopy in its raised position. Furthermore, the canopy is still removable from the stroller quite easily in the event that it has to be cleaned or because it is not needed simply by detaching the canopy bails from the pusher handle arms.

Finally, the canopy also functions as a locking device. Therefore, the canopy should find wide application on strollers and other juvenile furniture used to transport children.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
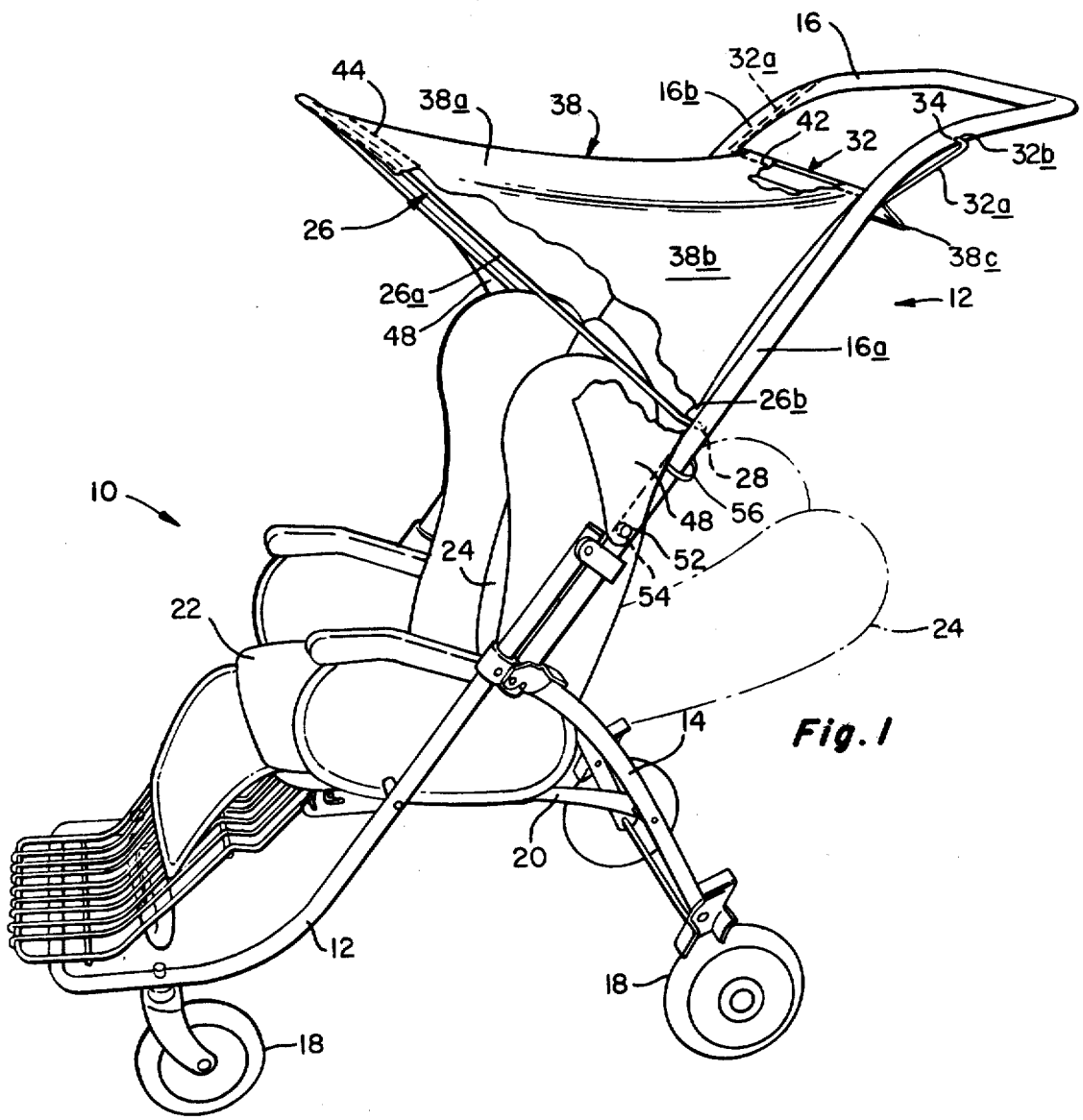
FIG. 1 is a perspective view with parts broken away of a collapsible stroller embodying the canopy structure of this invention and showing the canopy in its lower open position.

Turning to FIG. 1 of the drawings, the subject stroller indicated generally at 10 is fitted with a canopy indicated generally at 12 made in accordance with this invention. The stroller frame structure or gear is more or less conventional. It includes a generally U-shaped forward frame member 12, a U-shaped rear frame member 14 and an upstanding inverted U-shaped pusher handle 16. Wheels 18 are rotatively connected to the lower corners of the frame members 12 and 14.

A generally U-shaped seat-supporting member 20 is hinged to frame member 12 and pusher handle 16. That member supports a rigid seating platform 22. Hinged to the rear edge of frame member 20 or platform 22 is a rigid backrest 24 which can be moved selectively between an upright position shown in solid lines in FIG. 1 and a reclining position shown in dotted lines in that same figure. The illustrated stroller 10 can be manipulated between an upright position illustrated in FIG. 1 and a collapsed position illustrated in FIG. 3 wherein the pusher handle 16 is swung forwardly permitting the frame members 12 and 14 to spread apart so that the pusher handle and seating platform can repose adjacent the ground. The stroller frame structure or gear is conventional, being disclosed in U.S. Pat. No. 3,847,406. Therefore, it will not be described in detail here. Suffice it to say that the gear structure is merely exemplary of the type with which the canopy 12 can be used.

Still referring to FIG. 1, canopy 12 includes a relatively large, generally U-shaped bail 26 having spaced-apart parallel arms 26a which are situated just inside the pusher handle arms 16a. The ends of the bail arms 26a are bent outwardly at 26b and are received in openings 28 formed in the inboard walls of the pusher handle arms 16a at locations spaced relatively closely above the top of the stroller backrest 24. A second shallower generally U-shaped bail 32 is positioned above bail 26 near the top of the pusher handle 16. The bight of bail 32 is longer than that of bail 26 and, in fact, its opposite ends extend laterally beyond the pusher handle arms 16a. The bail 32 has parallel arms 32a which are located outboard of the pusher handle arms 16a. Furthermore, the free ends 32b of the bail arms 32a are bent toward one another and engaged in openings 34 formed in the outboard walls of arms 16a at locations near the top of the pusher handle. Accordingly, the swinging excursion of the bail 32 is confined below the plane of the pusher handle 16.

A flexible fabric canopy body 38 is mounted between bails 26 and 32. More particularly, the body 38 includes a generally rectangular section 38a having a hem 42 at its rear or trailing edge which engages around the bight of bail 32. Likewise, a hem 44 formed at the leading edge of the body section 38a engages around the bight of bail 26. The length of section 38a is such that when the bail 26 lies in a substantially horizontal or slightly upwardly inclined plane, the fabric body section 38a is in a tensioned or taut condition. Preferably also, the fabric body includes a pair of side panels 38b contiguous to section 38a which extend between that section and the pusher handle arms 16a. Also a fabric flap 38c depends from hem 42 below bail 32.

In order to maintain the canopy in its lower position illustrated in FIG. 1, there is provided a pair of side flaps 48 which depend from the lower edges of the fabric panels 38b. The lower ends of those flaps carry snap fastener elements 52 which are arranged to be removably secured to mating snap fastener elements 54 mounted to the outboard sides of the pusher handle arms 16a. Additionally, to help secure the panels 38b, elastic loops 56 may be provided adjacent flaps 48 which engage about the pusher handle arms 16a as illustrated in FIG. 1.

Figure 2:
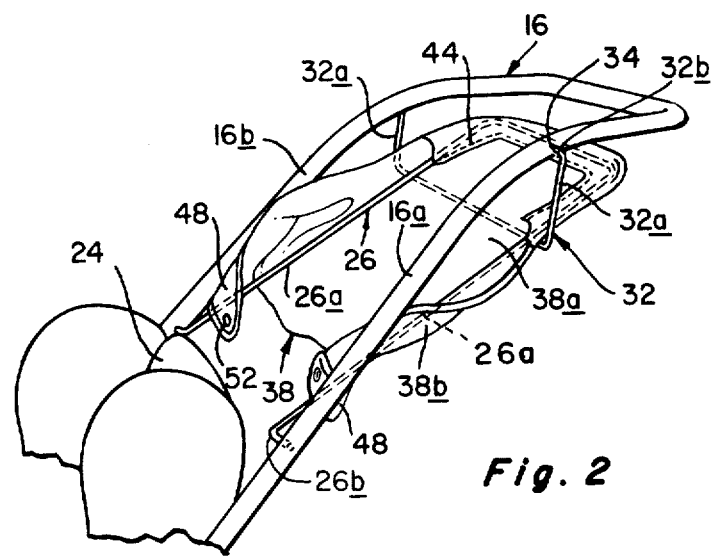
FIG. 2 is a fragmentary perspective view of the FIG. 1 stroller showing the canopy structure in its raised position.

When the canopy 12 is in its open or lower position illustrated in FIG. 1, it overhangs the seating platform 22 and protects the stroller occupant from the weather. When such protection is not needed, the canopy 12 may be swung to its upper or raised position illustrated in FIG. 2. To accomplish this, one simply unsnaps the snap fastener elements 52 and lifts the bail 26, the loops 56 sliding up the handle arms 16a in the process. This untensions the fabric body 38 permitting the upper bail 32 to swing down below the pusher handle a distance determined by the length of the bail arms 32a. Continued swinging movement of the bail 26 results in the fabric body 38 being folded between the pusher handle arms 16a until the bail 26 engages and is supported by the bail 32.

Since the bail 32 is located behind and below the pusher handle 16, the bail 26 and the canopy fabric body 38 are both situated below and rearwardly of the plane of the pusher handle completely out of the way, allowing a clear line of sight between the parent pushing the stroller and the stroller occupant. Furthermore, when the canopy is in its raised condition, the bail 26 is in an overcentered condition relative to its pivots at openings 28. Therefore, if the stroller should be tipped so that its front wheels 18 are lower than its rear wheels as when the stroller is maneuvered down stairs or over curbing, the canopy 12 has little tendency to swing of its own accord to its lower position illustrated in FIG. 1. Accordingly, no straps or other securing means are really required to retain the canopy in its FIG. 2 raised position.

Figure 3:
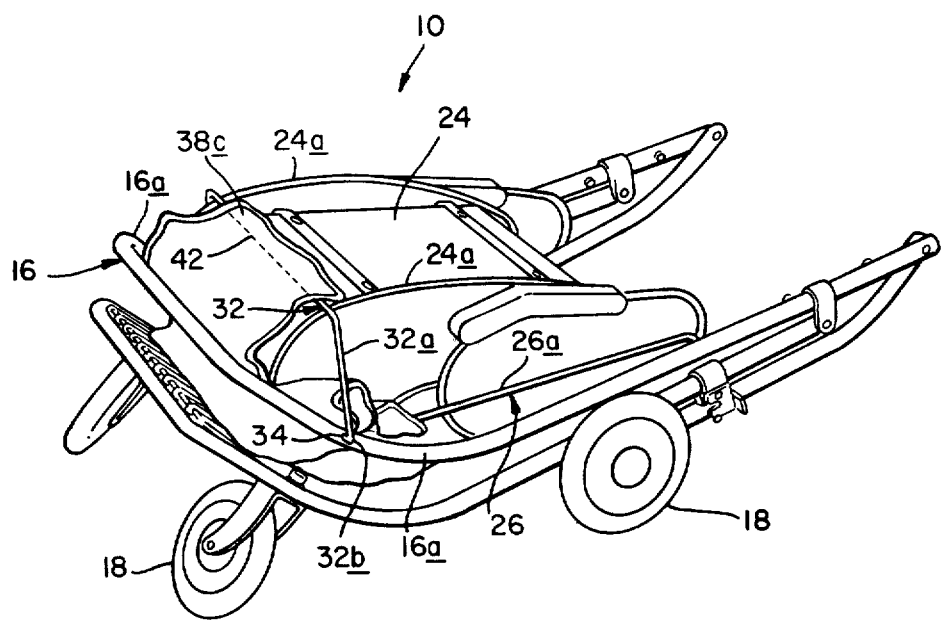
FIG. 3 is a perspective view showing the canopy structure locking the stroller in its collapsed position.

Turning now to FIG. 3, when it is desired to collapse the stroller 10 for purposes of transportation or storage, the backrest 24 is moved to its reclining position shown in dotted lines in FIG. 1. Then the stroller gear lock described in the aforesaid patent is released permitting the pusher handle 16 to be swung forwardly and downwardly. This results in the frame members 12 and 14 spreading apart so that the seating platform 22 and the folded-forward backrest 24 are free to collapse downwardly so that they are positioned more or less coplanar with the sprayed frame members 12 and 14 as described more particularly in the aforementioned patent.

When the stroller is in this fully collapsed position, the backrest is swung from its reclining position forwardly until it lies between the arms of pusher handle 16 as shown in FIG. 3. Then the canopy bail 32 is engaged over the now upper edges 24a of the backrest 24 so that it effectively locks the pusher handle 16 to the backrest thereby retaining the stroller in its collapsed position. Accordingly, for the first time as far as applicants are aware, canopy structure actually helps to lock a collapsible stroller in its collapsed position. A strap (not shown) may be provided at the rear of the carriage enabling a parent to pull the collapsed carriage along the gound on the carriage front wheels 18.

When the stroller is to be used again, the bail 32 is simply swung back from the awayrest edges 24a and the pusher handle 16 is swung upwardly and rearwardly causing the frame members 12 and 14 to assume their erect condition illustrated in FIG. 1. The locking means described in said parent thereupon locks the frame members in their fully open positions.

Accordingly, simply by supporting the trailing edge of the canopy by way of a relatively shallow bail which is longer than the distance between the stroller pusher handle arms and engaging that bail on the outboard sides of the pusher handle arms, one provides for over-centered nesting of the raised canopy and also provides for the locking of the stroller in its collapsed position, neither of which functions are performed by the canopy structures of prior conventional strollers and carriages of this general type. Furthermore, the inclusion of the aforesaid canopy nesting and locking features does not materially increase the overall cost of the stroller.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. In a collapsible baby vehicle of the type including a front wheeled frame member, a rear wheeled frame member, a seat-supporting frame member and a pusher handle all being pivotally connected to permit the seat-supporting frame member to be moved from an elevated location above the ground to a collapsed position wherein the seat-supporting frame member is located adjacent the ground, the improvement comprising
A. a generally U-shaped bail whose bight is shorter than the distance between the arms of the pusher handle,
B. first means for pivotally connecting the free ends of the bail arms to the pusher handle arms at the inboard walls thereof at locations spaced above the seat-supporting frame member,
C. a second generally U-shaped bail shallower than the first whose bight is longer than the distance between the pusher handle arms,
D. second means for pivotally connecting the free ends of the second bail arms to the pusher handle arms at the outboard walls thereof at locations spaced above the first connecting means,
E. a flexible fabric body having a leading edge connected to the bight of the first bail and a trailing edge connected to the bight of the second bail, the length of the fabric body being such that when the first bail is in a lower position wherein it lies in a substantially horizontal plane, the second bail bight engages the pusher handle and the fabric body is in a taut condition, said first bail being swingable between said lower position and a raised position wherein it is swung behind and below the pusher handle and reposes on the now depending second bail, thereby to maintain the fabric body in a folded out-of-the-way position behind and below the plane of the pusher handle.

2. The vehicle defined in claim 1 and further including fabric body side panels extending between the side edges of the fabric body and the arms of the pusher handle so that the canopy forms a hood over the seat-supporting member.

3. The vehicle defined in claim 2 and further including coacting means on the panels and the pusher handle arms for removably securing the lower ends of the panels to the arms.

4. The vehicle defined in claim 3 wherein said coacting means comprise male and female snap fastener elements.

5. The vehicle defined in claim 1 and further including
A. an adjustable backrest hinged to the vehicle near the rear of the seat-supporting frame member, and
B. wherein said second bail is dimensioned so that, when the stroller is in its collapsed position, the bight of the second bail can engage under the backrest to secure the backrest to the pusher handle and thereby help retain the stroller in its collapsed position.

6. The vehicle defined in claim 1 wherein the connecting means comprise
A. the free ends of the bails, and
B. means defining openings in the walls of the pusher handle arms.

* * * * *